United States Patent
Schürmann et al.

(10) Patent No.: US 10,782,456 B2
(45) Date of Patent: Sep. 22, 2020

(54) REFLECTOR ELEMENT AND A METHOD FOR MANUFACTURING SAME

(71) Applicant: SITECO GMBH, Traunreut (DE)

(72) Inventors: Mark Schürmann, Jena (DE); Peter Munzert, Jena (DE); Dirk Salz, Bremen (DE); Klaus Stockwald, Germering (DE); Reinhard Schaefer, Heidenheim (DE); Stefan Kotter, Augsburg (DE); Paul Braun, Nordendorf (DE)

(73) Assignee: SITECO GMBH, Traunreut (DE)

( * ) Notice: Subject to any disclaimer, the term of this patent is extended or adjusted under 35 U.S.C. 154(b) by 0 days.

(21) Appl. No.: 15/553,942

(22) PCT Filed: Feb. 26, 2016

(86) PCT No.: PCT/EP2016/054132
§ 371 (c)(1),
(2) Date: Aug. 25, 2017

(87) PCT Pub. No.: WO2016/135313
PCT Pub. Date: Sep. 1, 2016

(65) Prior Publication Data
US 2018/0045864 A1    Feb. 15, 2018

(30) Foreign Application Priority Data
Feb. 27, 2015    (DE) .................. 10 2015 102 870

(51) Int. Cl.
*F21V 9/04* (2018.01)
*F21V 9/06* (2018.01)
(Continued)

(52) U.S. Cl.
CPC ............ *G02B 5/0808* (2013.01); *G02B 1/14* (2015.01)

(58) Field of Classification Search
CPC .. G02B 5/0808; G02B 5/0825; G02B 5/0858; G02B 5/0866; G02B 5/0891;
(Continued)

(56) References Cited

U.S. PATENT DOCUMENTS 5,361,172 A    11/1994   Schissel et al.
5,424,876 A    6/1995    Fujii
(Continued)

FOREIGN PATENT DOCUMENTS

DE        4122555        1/1993
DE        102006011973   9/2007
(Continued)

OTHER PUBLICATIONS

Naumann, H. et al., "Bauelemente der Optik", Hanser, 1987, 5 Auflage, pp. 67-69, ISBN 3-446-14960-0.
(Continued)

*Primary Examiner* — Mustak Choudhury
(74) *Attorney, Agent, or Firm* — Slater Matsil, LLP

(57) ABSTRACT

A reflector element and a method for manufacturing a reflector element are disclosed. In an embodiment the reflector element includes a plastic substrate and a silver layer arranged on the plastic substrate. The reflector element further includes a first barrier layer arranged on the silver layer, wherein the barrier layer has an at least 15 nm-thick oxide layer and a second barrier layer arranged on the first barrier layer, wherein the barrier layer includes siloxane, and wherein a thickness of the second barrier layer is at least 250 nm and at most 450 nm.

20 Claims, 5 Drawing Sheets

(51) Int. Cl.
*G02B 5/08* (2006.01)
*G02B 5/20* (2006.01)
*G02B 1/14* (2015.01)

(58) Field of Classification Search
CPC . G02B 5/085; G02B 5/06; G02B 5/12; G02B 5/132; G02B 5/136; G02B 5/282; G02B 1/14; G02B 1/105; G02B 17/00; C03C 17/3644; C03C 17/3663; C03C 17/3678; C03C 17/3642; C03C 17/36; C03C 17/38; C23C 16/401; C23C 16/402; C23C 28/00; C23C 28/3455; C23C 28/321; C23C 28/322; C23C 28/345; B32B 17/10018; B32B 17/10174; B05D 1/62; B05D 5/06; B05D 5/063; F21S 41/37; F21V 7/22; F21V 7/24; F21V 7/28; F21V 7/30; F21V 9/04; H01L 51/5253; H01L 27/14629; H01L 23/564
USPC ......... 359/360, 507; 427/452, 489; 428/412, 428/446, 447, 469, 623
See application file for complete search history.

(56) References Cited

U.S. PATENT DOCUMENTS

| | | |
|---|---|---|
| 5,548,440 A | 8/1996 | Hohenegger et al. |
| 5,583,704 A | 12/1996 | Fujii |
| 5,751,474 A | 5/1998 | Hohenegger et al. |
| 6,078,425 A | 6/2000 | Wolfe et al. |
| 6,520,650 B2 | 2/2003 | Fraizer |
| 7,157,145 B2 * | 1/2007 | Vissing .................... B05D 1/62 427/452 |
| 7,182,475 B2 | 2/2007 | Kramer et al. |
| 2002/0154407 A1 * | 10/2002 | Frazier .................. C23C 16/401 359/507 |
| 2003/0219632 A1 * | 11/2003 | Schaepkens .......... C23C 16/345 428/698 |
| 2013/0033773 A1 | 2/2013 | Templin et al. |
| 2013/0216859 A1 * | 8/2013 | Kuhlmann ........ B32B 17/10018 428/623 |

FOREIGN PATENT DOCUMENTS

| | | |
|---|---|---|
| DE | 102007010124 | 11/2008 |
| DE | 102010013865 | 10/2011 |
| EP | 1154289 | 11/2001 |
| WO | 2008104389 | 9/2008 |
| WO | 2013124017 | 8/2013 |

OTHER PUBLICATIONS

Schmauder, T. et al.: "High Reflective SilverCoatings on 3D PlasticParts for Solar Concentrators", Society of Vacuum Coaters, 2009, pp. 473-477.

Hass, G. et al., "Reflectance and Durability of Ag Mirrors Coated With Thin Layers of Al2O3 Plus Reactively Deposited Silicon Oxide". Applied Optics, vol. 14, Nov. 11, 1975, pp. 2639-2644.

Munzert, P. et al., "Hochreflektierende Beschichtungen auf Kunststoffoptiken", IOF Veröffentlichung zu Silberspiegel auf Kunststoffen. 5 pages.

Paussa, L. et al., "Protection of silver surfaces against tarnishing by means of alumina/titaniananolayers", Surface & Coatings Technology, vol. 206, 2011, pp. 976-980.

* cited by examiner

REFLECTOR ELEMENT AND A METHOD FOR MANUFACTURING SAME

This patent application is a national phase filing under section 371 of PCT/EP2016/054132, filed Feb. 26, 2016, which claims the priority of German patent application 10 2015 102 870.0, filed Feb. 27, 2015, each of which is incorporated herein by reference in its entirety.

TECHNICAL FIELD

The invention relates to a reflector element which has, in particular, a plastic substrate with a reflective coating.

BACKGROUND

A reflector element can be provided, for example, for applications in optical systems, in particular lighting devices. The lighting devices can be lamps of all kinds, in particular LED lights, headlights for stage lighting or motor vehicle headlights.

In such applications, as a rule high reflectivity is required for the reflector element, said reflectivity being distinguished by good long-term stability, in order to achieve high efficiency and a long service life of the optical system.

A plastic substrate which is provided with a reflective aluminum layer can be sufficiently protected against environmental influences to achieve satisfactory long-term stability, with a protective layer made of a silicon organic compound (siloxane) which is manufactured by plasma polymerization and has a thickness of between 50 nm and 200 nm. However, with conventional reflective aluminum coatings on plastic substrates it is only possible to achieve reflectivity of approximately 92.5%.

It is known that a particularly high reflectivity in the visible spectral range can be achieved with coatings made of silver. However, a silver layer does not have sufficient long-term stability under environmental influences, even if the silver layer is provided with a conventional protective layer, as is used in the case of reflective aluminum coatings. If the thickness of the siloxane protective layer were to be increased to a value of more than 500 nm, in order to achieve better long-term stability when using a silver layer, the increase in the reflectivity in comparison with aluminum coating would be only very small, and in particular reflectivity in the blue spectral range would be reduced.

SUMMARY OF THE INVENTION

Embodiments of the invention provide an improved reflector element which is distinguished by a high reflectivity in the visible spectral range and an improved long-term stability, wherein, in particular, the reflectivity in the blue spectral range is as far as possible not to be adversely affected. Further embodiments of the invention provide a suitable method for manufacturing the reflector element.

According to at least one refinement, the reflector element comprises a plastic substrate which is preferably shaped in a three-dimensional fashion. The plastic substrate is preferably at least partially curved. The reflector element can be provided, in particular, for forming the beam of the radiation which is emitted by a lighting means, for example, for collimating or focusing the radiation.

The plastic substrate can be manufactured, for example, by injection molding or deep drawing in a three-dimensional shape which is suitable for the application provided. The plastic substrate preferably has a thermoplast. Furthermore, duroplasts which can be injection molded and which are distinguished by good dimensional stability are also suitable.

The plastic substrate can have, in particular, PC (polycarbonate), PMMA (polymethylmethacrylate) or PBT (polybutylene terephthalate). The plastic such as, for example, polycarbonate can have additives of a further plastic such as, for example, ABS. Furthermore, it is possible that the plastic has additives such as, for example, pigments, oxidic or nitridic filler materials (powders or fibers), in order to bring about, for example, a desired color impression, an increased thermal conductivity or a reduction in the thermal coefficient of expansion in order to improve the heat distortion resistance of the three-dimensional shape. The thermal coefficient of expansion of the plastic substrate can be, for example, between $30*10^{-6}$ $K^{-1}$ and $100*10^{-6}$ $K^{-1}$.

The plastic substrate advantageously has at least partially a surface roughness of less than 20 nm, preferably of less than 15 nm, particularly preferably of less than 5 nm, in order to achieve high specular reflection. It is also possible that individual zones of the plastic substrate have greater roughness in the µm range in order to achieve diffuse scattering.

The plastic substrate has a thickness of preferably at least 10 µm, wherein the thickness for a dimensionally stable three-dimensional shape of the reflector element is preferably at least 500 µm, in particular from 500 µm to 2000 µm.

Furthermore, the reflector element has, as a reflective layer, a silver layer which is arranged over the plastic substrate. "Arranged over the plastic substrate" means in this context that the silver layer either directly adjoins the plastic substrate or that alternatively at least one intermediate layer is arranged between the plastic substrate and the silver layer. The silver layer preferably has a thickness of at least 35 nm, particularly preferably between 100 nm and 200 nm. The silver layer can be applied, for example, by vapor coating or sputtering.

A first barrier layer which is preferably an oxide layer is advantageously arranged over the silver layer. The first barrier layer preferably directly adjoins the silver layer. In particular, the first barrier layer can have an oxide of at least one of the materials Al, Si, Y or Ti. The first barrier layer preferably has a thickness of at least 15 nm.

A second barrier layer, which preferably directly adjoins the first barrier layer, is arranged over the first barrier layer. The second barrier layer advantageously has a siloxane. According to one preferred refinement, the second barrier layer is at least 250 nm and at most 450 nm thick. The second barrier layer is advantageously the outermost layer of the reflector element, i.e., no further layers are arranged over the second barrier layer.

It has become apparent that by virtue of the combination, described here, of the at least 15 nm-thick oxide layer as a first barrier layer and the at least 250 nm-thick siloxane layer as a second barrier layer, protection of the silver layer is achieved, which ensures high reflectivity over long time periods even under difficult climatic conditions. In particular, good resistance in the case of temperature change loading and/or under the influence of moisture is achieved. The reflectivity is preferably more than 93.5%.

By virtue of the fact that the second barrier layer is not more than 450 nm thick and is, in particular, the outermost layer of the reflector element, weakening of the blue portion of the reflected radiation by absorption, which can occur in the case of a thicker second barrier layer and/or when a further layer is applied as a cover layer, is advantageously reduced. This advantageously reduces yellow coloring of the reflected light which could arise as a result of partial absorption of the blue portion in the barrier layer.

The second barrier layer is advantageously the top layer of the reflector element. The thickness of the second barrier layer of at least 250 nm provides particularly good protection against environmental loading without a further cover layer, which could adversely affect the optical properties of the reflector element, being used.

In one preferred refinement, the first barrier layer contains aluminum oxide, silicon oxide or yttrium oxide. In particular, the first barrier layer can have $Al_2O_3$, $SiO_2$ or $Y_2O_3$ or be composed thereof. Owing to the comparatively low refractive index, a silicon oxide such as, for example, $SiO_2$ is particularly well suited if the reflection of the silver layer arranged underneath the first barrier layer is to be adversely affected as little as possible, in particular in the blue spectral range.

The thickness of the first barrier layer is advantageously selected such that, on the one hand, a sufficient protective effect is achieved but, on the other hand, the optical properties are adversely affected as little as possible. The first barrier layer advantageously has a thickness between 15 nm and 150 nm. For the optical properties, in particular a high transmission, it is advantageous if the first barrier layer is not more than 60 nm thick. The thickness of the first barrier layer is particularly preferably between 40 nm and 60 nm.

In one advantageous refinement, a metallic intermediate layer is arranged between the plastic substrate and the silver layer. The metallic intermediate layer preferably has at least one of the metals chromium, copper, nickel or titanium or is composed of one of these metals. Chromium is particularly preferably used. The thickness of the metallic intermediate layer is advantageously 15 nm to 75 nm, preferably not more than 50 nm. The metallic intermediate layer can be, for example, approximately 30 nm thick.

The metallic intermediate layer has the advantage that it acts as an adhesion promoting layer between the plastic substrate and the silver layer and in this way increases the resistance of the reflector element with respect to thermomechanical loading. Furthermore, the metallic intermediate layer can compensate unevennesses of the surface of the plastic substrate in the range up to approximately 15 nm, and in this way improve the resulting reflectivity of the subsequent silver layer. Furthermore, the intermediate layer can act as a diffusion barrier for gases such as, for example, water vapor and/or oxygen, which otherwise diffuse out of the plastic substrate to the reflective silver layer and in this way could bring about degradation of the silver layer.

It has become apparent that there is a relationship between the absorption properties of the second barrier layer in the infrared spectral range and the optical properties in the visual spectral range. The second barrier layer which is preferably manufactured by means of plasma polymerization can be characterized, in particular, by FTIR absorption spectroscopy.

In one preferred refinement, an integral IR absorption of the second barrier layer in the wave number range from 850 $cm^{-1}$ to 950 $cm^{-1}$ is less than 65% of the integral IR absorption in the wave number range from 1000 $cm^{-1}$ to 1100 $cm^{-1}$. In the wave number range from 850 $cm^{-1}$ to 950 $cm^{-1}$, in particular absorption of Si—$CH_3$ groups and Si—O groups with little cross-linking occurs, while in the wave number range from 1000 $cm^{-1}$ to 1100 $cm^{-1}$ the absorption of essentially O—Si—O bonds is determined.

It has been found that the ratio of the integral IR absorption in the wave number range from 850 $cm^{-1}$ to 950 $cm^{-1}$ with respect to the integral IR absorption in the wave number range from 1000 $cm^{-1}$ to 1100 $cm^{-1}$ correlates with the difference between the average reflectivity $R_{vis}$ in the visible spectral range of 420 nm to 760 nm and the average reflectivity $R_{blue}$ in the blue spectral range from 420 nm to 480 nm. It has been shown that a difference between the average reflectivity $R_{vis}$ in the visible spectral range of 420 nm to 760 nm and the average reflectivity $R_{blue}$ in the blue spectral range from 420 nm to 480 nm of less than 1.5% can be achieved if the integral IR absorption of the second barrier layer in the wave number range from 850 $cm^{-1}$ to 950 $cm^{-1}$ is less than 65% of the integral IR absorption in the wave number range from 1000 $cm^{-1}$ to 1100 $cm^{-1}$. In other words, the average reflectivity $R_b$ in the blue spectral range from 420 nm to 480 nm is not more than 1.5% less than the average reflectivity in the visible spectral range from 420 nm to 760 nm. In this case, the reflector element is distinguished, in particular, by the fact that the reflected radiation does not have any yellow coloring.

The structural properties and the resulting infrared spectrum of the second barrier layer can be influenced by the growth conditions during growth. The siloxane layer which serves as a second barrier layer can be manufactured by a PECVD method, in particular by plasma polymerization of a silicon organic compound. The quality of this layer and the resulting infrared spectrum can be influenced by the process control of the plasma polymerization, in particular the monomer composition, the plasma power, the addition of oxygen and/or the temperature profile of the substrate.

The process conditions during the plasma polymerization permit various properties of the siloxane layer to be adjusted, in particular of the barrier effect with respect to water diffusion and gas diffusion, of the optical transparency in the blue spectral range (yellow coloring), mechanical properties such as, in particular, the elasticity range in order to avoid the formation of fractures in the case of differing expansion of the substrate and of the layer materials, as well as the surface energy, for example, the contact angle for water in order to adjust a hydrophobic surface characteristic.

The method for manufacturing the reflector element comprises, according to at least one refinement, making available a plastic substrate which is preferably shaped in a three-dimensional fashion, applying a silver layer, applying a first barrier layer, which is an at least 15 nm-thick oxide layer, by means of a PVD method, and applying a second barrier layer by means of a CVD method, wherein the second barrier layer is a siloxane layer which has a thickness of at least 250 nm and at most 450 nm, and is preferably the outermost layer of the reflector element.

The application of the first barrier layer is preferably carried out by means of a sputtering method, in particular by means of reactive sputtering in an oxygen plasma. For example, targets made of aluminum, silicon, titanium or yttrium are used and an aluminum oxide layer, a silicon oxide layer, a titanium dioxide layer or an yttrium oxide layer is generated in an oxygen plasma by sputtering.

The second barrier layer is preferably manufactured by plasma polymerization of a silicon organic compound. The silicon organic compound can have, in particular, hexamethyldisiloxane (HMDSO) or tetramethyldisiloxane (TMDSO).

Further advantageous refinements of the method can be found in the description of the reflector element, and vice versa.

BRIEF DESCRIPTION OF THE DRAWINGS

The invention will be explained in more detail below on the basis of exemplary embodiments and in connection with the FIGS. 1 to 5, of which.

The illustrated components and the size ratios of the components with respect to one another are not to be considered true to scale.

DETAILED DESCRIPTION OF ILLUSTRATIVE EMBODIMENTS

Figure 1:
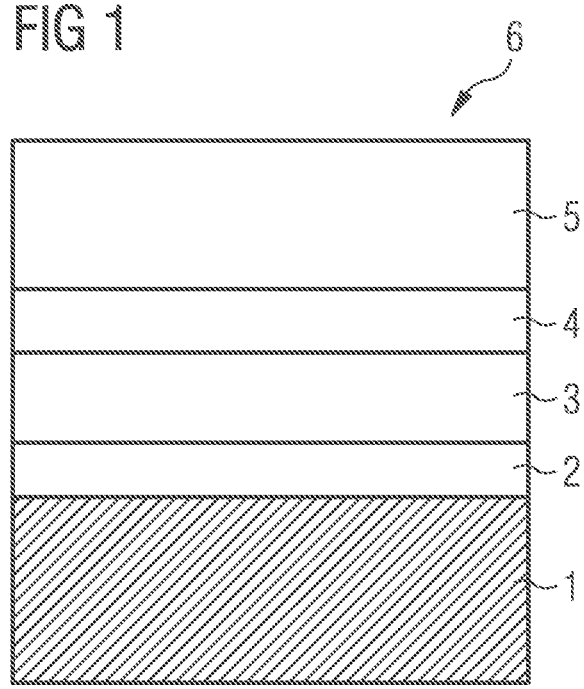
FIG. 1 shows a schematic illustration of a cross section through a reflector element according to an exemplary embodiment.

The reflector element 6 which is illustrated schematically in cross section in FIG. 1 is formed by a sequence of layers applied to a substrate 1. For the sake of simplification, the substrate 1 is illustrated here as a planar substrate. In the case of the reflector element 6, the substrate 1 can, however, be, in particular, a curved substrate. The substrate can be manufactured, for example, by means of a shaping method such as injection molding or deep drawing and can have any desired three-dimensional shape. In particular, the substrate 1 can have an at least partially curved surface shape which is provided for an optical application. The surface roughness of the substrate 1 is advantageously less than 15 nm, particularly preferably less than 5 nm.

The material of the substrate 1 is preferably a plastic, in particular a thermoplast or a duroplast. The substrate 1 can contain, in particular, PC (polycarbonate), PMMA (polymethylmethacrylate) or PBT (polybutylene terephthalate). The plastic can, if appropriate, have an additive added to it such as, for example, ABS (acrylonitrile-butadiene-styrene). Furthermore, it is possible for pigments such as, for example, TiO$_2$ particles to be added to the plastic in order, for example, to influence the color impression or the thermal conductivity of the substrate material.

In the exemplary embodiment, an intermediate layer 2 is arranged between the substrate 1 and a silver layer 3 which is arranged over the latter and functions as a reflector layer. The intermediate layer 2 can have, in particular, the function of an adhesion promoting layer and is preferably a metallic layer which has or is composed of, in particular, chromium, copper, titanium or nickel. Chromium or copper is particularly preferably used. The intermediate layer 2 can advantageously also contribute to the smoothing of the substrate surface and/or act as a diffusion barrier for substances which could diffuse out of the substrate (for example, small quantities of water and/or oxygen) in the direction of the silver layer 3. The intermediate layer is preferably 15 nm to 75 nm, for example, 30 nm thick. The intermediate layer can be applied, for example, by sputtering.

The silver layer 3 which acts as a reflector layer is approximately 100 nm to 200 nm, preferably 150 nm to 200 nm, thick. The silver layer 3 is preferably applied by sputtering. By using silver as a material for the reflector layer, particularly high reflection is advantageously achieved in the visible spectral range.

In order to protect the silver layer 3 against environmental influences, in particular temperature change loading and moisture, a combination of a first barrier layer 4 and a second barrier layer 5 is arranged in the reflector element 6. The first barrier layer 4 is advantageously an oxide layer which is, for example, between 15 nm and 150 nm thick. With respect to the optical properties, it is advantageous if the first barrier layer 4 is less than 60 nm, for example, between 40 nm and 60 nm thick. Preferred materials for the first barrier layer 4 are SiO$_2$ and Al$_2$O$_3$. The first barrier layer 4 is applied, for example, by reactive sputtering.

In order to achieve the desired long-term stability, a second barrier layer 5 is arranged over the first barrier layer 4 in the reflector element 6. The second barrier layer 5 can be manufactured, in particular, by plasma-enhanced chemical vapor deposition (PEVCD). The second barrier layer 5 is preferably a siloxane layer which is applied, in particular, by plasma polymerization of HMDSO (hexamethyldisiloxane) or TMDSO (tetramethyldisiloxane) or mixtures thereof or of other silicon organic compounds.

It is particularly advantageous for the long-term stability, on the one hand, and the optical properties, on the other, if the thickness of the second barrier layer 5 is between inclusively 250 nm and inclusively 450 nm. Given a thickness of preferably at least 250 nm, a particularly good barrier effect against the diffusion of water and gas is achieved. Furthermore, a thickness of at most 450 nm is advantageous in order, in particular, to keep the absorption of the second barrier layer 5 low. When there is a relatively large layer thickness of 450 nm, in particular the absorption at short wavelengths would increase significantly and therefore reduce the optical transparency for blue light. As a result of increased absorption at short wavelengths, in particular in the region of the blue light, a yellow color impression of the reflected radiation could therefore occur if an excessive layer thickness of the second barrier layer 5 were selected.

The second barrier layer 5 is preferably the outermost layer on the side of the reflector element 6 which faces away from the substrate. This is therefore advantageous because the abovementioned absorption effects which could occur when an excessively thick second barrier layer 5 is applied would occur, in particular when further layers are applied to the second barrier layer 5.

Furthermore, it is advantageous that the second barrier layer 5 is the outermost layer because in this way hydrophobic surface properties can be achieved. The use of a siloxane layer for the second barrier layer 5 has, inter alia, the advantage that this material has hydrophobic surface properties. The molecules of the siloxane layer have a stable Si—O—Si structure on which approximately 1.5 methyl groups are bound per Si atom on statistical average. The presence of these groups brings about the hydrophobic properties of the surface. If the second barrier layer 5 in the form of a siloxane layer is the outermost layer of the reflector element 6, the surface of the reflector element therefore acts in an advantageously water repellant fashion.

The quality of the second barrier layer 5 can be adjusted by means of the process control of the plasma polymerization with respect to monomer composition, plasma power, addition of O$_2$ and temperature profile of the substrate and can be characterized with respect to the structure composition by, inter alia, the FTIR absorption spectrum. The process conditions permit the adjustment of various properties of the siloxane layer, in particular the barrier effect with respect to the diffusion of water and gas, the optical transparency in the blue color (yellow coloring), the mechanical properties or the surface energy for adjusting a hydrophobic surface characteristic.

The outermost siloxane layer is, in particular, elastic and is distinguished by a strongly polymer-like structure which is distinguished in the FTIR spectrum by broad, strongly pronounced absorption in the range from 3000 cm$^{-1}$ to 3600 cm$^{-1}$, a strong Si—O band at about 1100 cm$^{-1}$ and high absorption levels in the range between the Si—O band (~1100 cm$^{-1}$) and 600 cm$^{-1}$, in particular in the range between 850 cm$^{-1}$ and 950 cm$^{-1}$ as a result of high portions of Si—(CH$_3$) molecular bonds. The deposition conditions of the siloxane layer are preferably adapted by the process control in such a way that the broadband FTIR absorption in the wave number range from 600 to 1000 cm$^{-1}$ is reduced. It is apparent that in this way the barrier properties and the transmission in the blue spectral range are improved, wherein the elasticity of the siloxane layer is retained in order to achieve the long-term stability.

Figure 2:
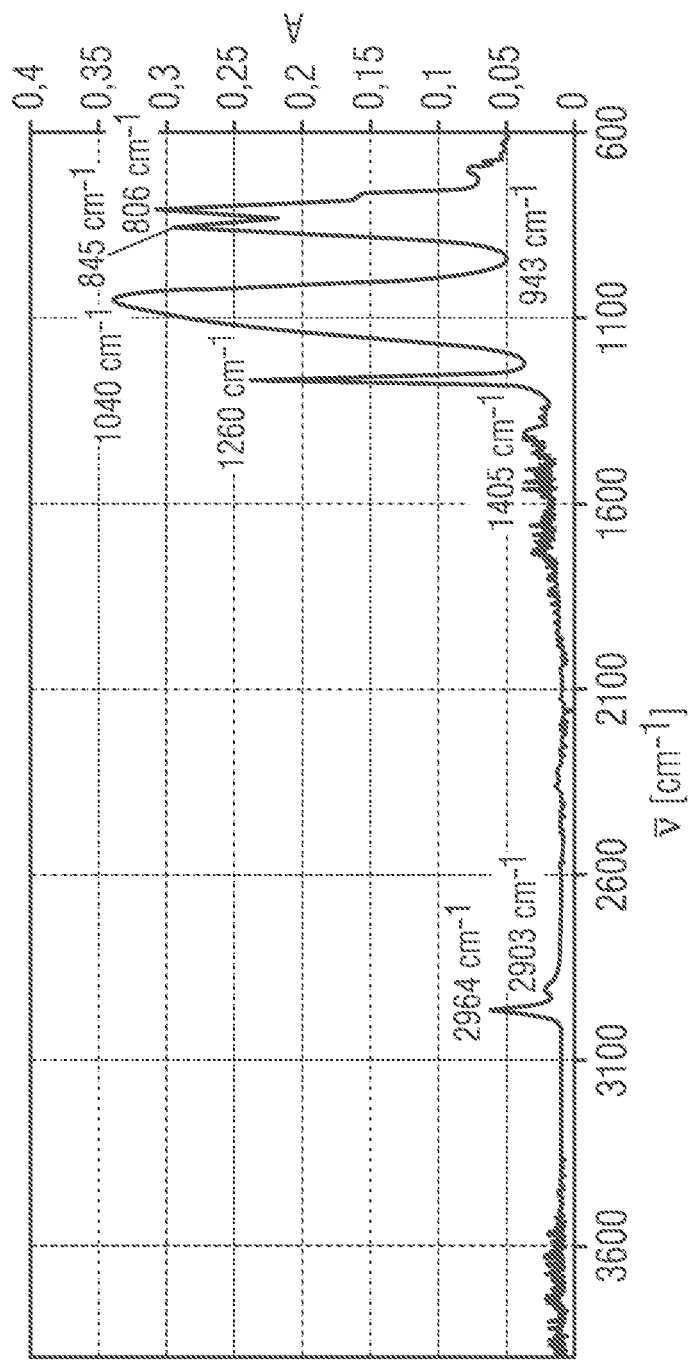
FIGS. 2 to 4 show a graphic illustration of FTIR absorption spectra of three different exemplary embodiments of the reflector element.
Figure 3:
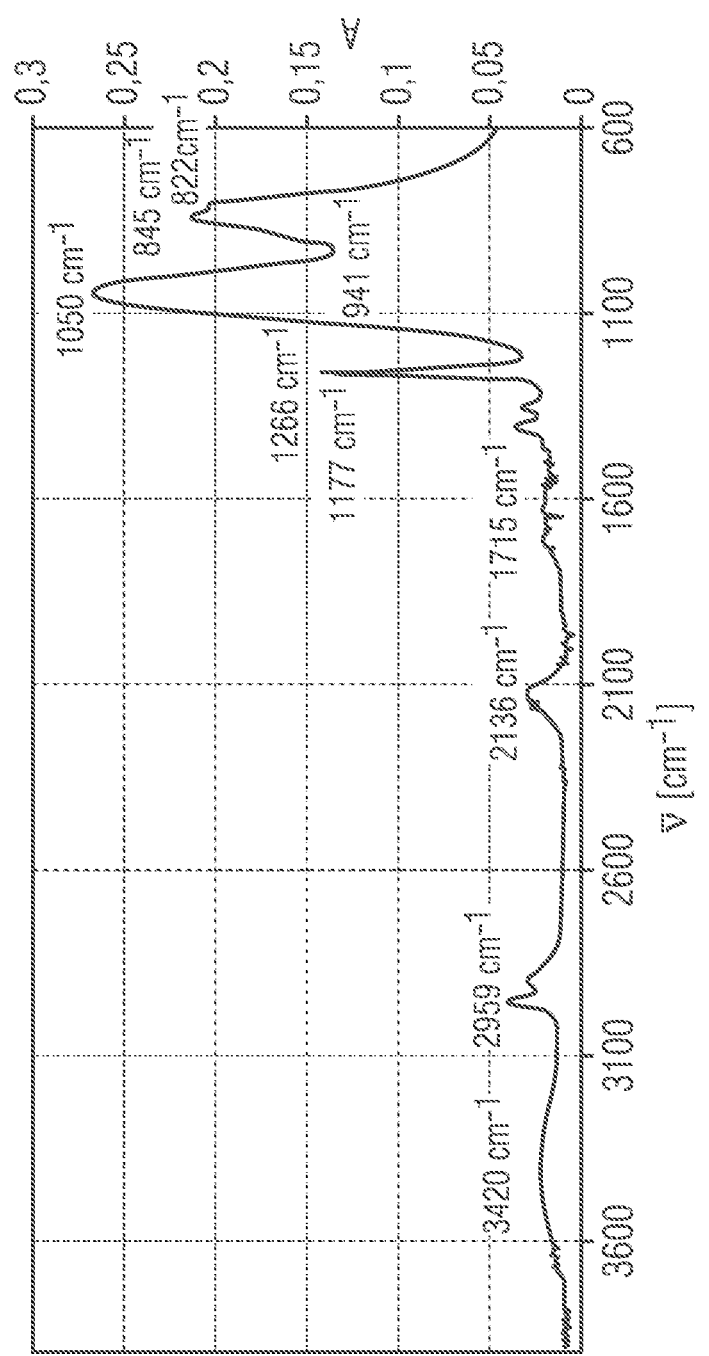
Figure 4:
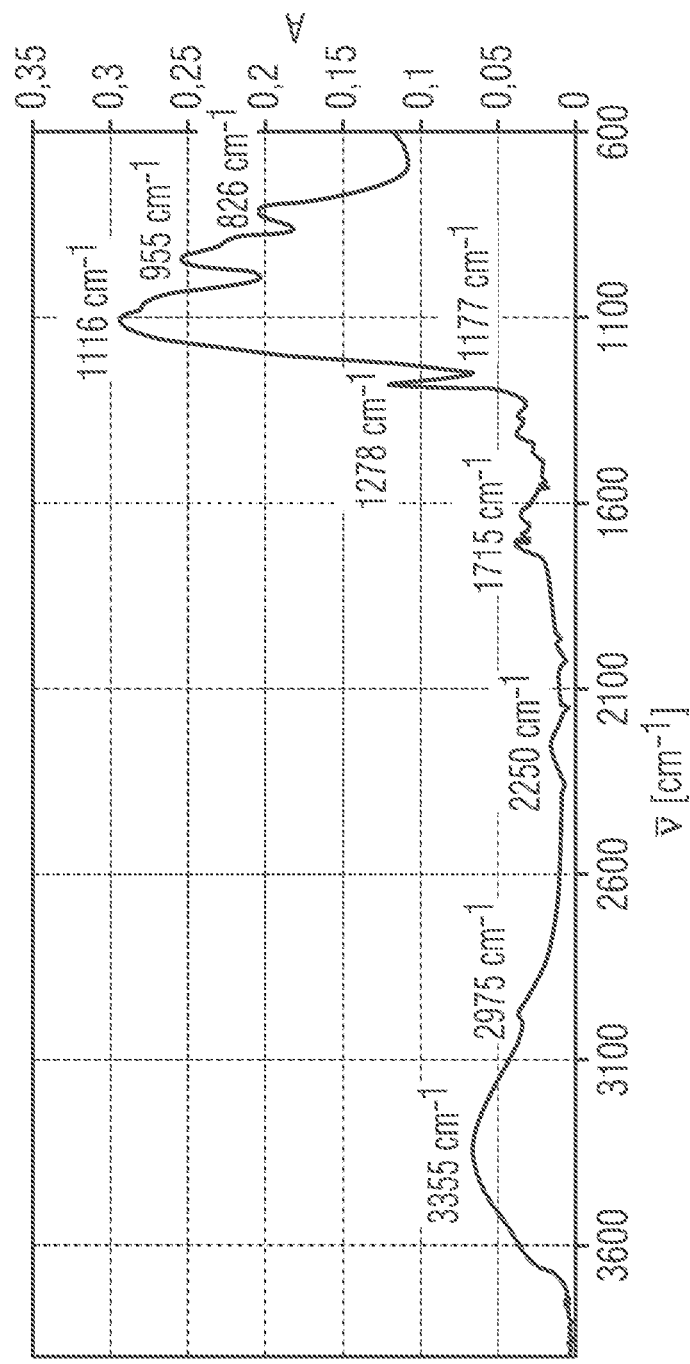

The FTIR absorption spectra of three exemplary embodiments of the reflector element 6 are illustrated in FIGS. 2, 3 and 4. The reflector element 6 with the FTIR absorption spectrum according to FIG. 2 has a substrate 1 composed of polycarbonate, a metallic intermediate layer composed of Cu with a thickness of approximately 30 nm, a reflective silver layer 3 with a thickness of approximately 150 nm to 220 nm, a first barrier layer 4 composed of SiO$_2$ with a thickness of approximately 90 nm and a second barrier layer 5 composed of siloxane with a thickness of approximately 310 nm.

The manufacture of the siloxane layer occurred in the exemplary embodiment after the coating of a reflector substrate body 1 with Cu, Ag and SiO$_2$ in a plasma polymerization coating system (Nano type from Diener electronics). A gas distributor system is provided here in a planar coating electrode of the substrate arranged in an insulated fashion over the mass electrode, at a distance of 75 mm from the substrate. The system has an electrode surface of 100× 100 mm and an effective plasma power of 280 W at the operating frequency of 13.56 MHz. In a first step, pretreatment took place for 1 minute by plasma formation in the argon plasma with 280 W RF power at an overall pressure of p=0.2 mbar in the plasma system. This was followed by a coating period of 5 minutes, wherein HMDSO was let in with a flow rate of 10 sccm, and a further 4 minutes of coating method in which both HMDSO with a flow rate of 10 sccm and O$_2$ with a flow rate of 40 sccm were let in. During the coating steps, the overall pressure in the plasma system continued to be p=0.2 mbar.

A further exemplary embodiment whose FTIR absorption spectrum is illustrated in FIG. 3 differs from the exemplary embodiment in FIG. 2 in that chromium instead of copper was used for the material of the metallic intermediate layer 2.

The further exemplary embodiment whose FTIR absorption spectrum is illustrated in FIG. 4 differs from the two previous exemplary embodiments in that no metallic intermediate layer has been arranged between the substrate 1 and the silver layer 3. Furthermore, the exemplary embodiment in FIG. 4 differs from the previous exemplary embodiments in that the first barrier layer 4 has Al$_2$O$_3$ instead of SiO$_2$.

It is apparent that in various exemplary embodiments of reflector elements differences in the FTIR absorption spectra occur as a function of the layer materials, layer thicknesses and growth conditions used.

In this context, a relationship was established between the FTIR absorption properties and the optical properties. The integral FTIR absorption of the O—Si—O bond in the range from 1100 cm$^{-1}$ to 1000 cm$^{-1}$ can be placed in a relationship with the absorption in the range from 950 cm$^{-1}$ to 850 cm$^{-1}$ in which the absorption of integrated Si—CH$_3$ and Si—O groups with little cross-linking occurs. This ratio A(850 cm$^{-1}$ ... 950 cm$^{-1}$)/A(1000 cm$^{-1}$ ... 1100 cm$^{-1}$)/shows a correlation with the difference $\Delta R_{vis-blue}=R_{vis}$(420 nm-760 nm)-R$_{blue}$ (420 nm-480 nm) between the reflectivity R$_{vis}$ which is averaged over the visual spectral range from 420 nm to 760 nm and the reflectivity R$_{blue}$ which is averaged over the blue spectral range from 420 nm to 480 nm.

Figure 5:
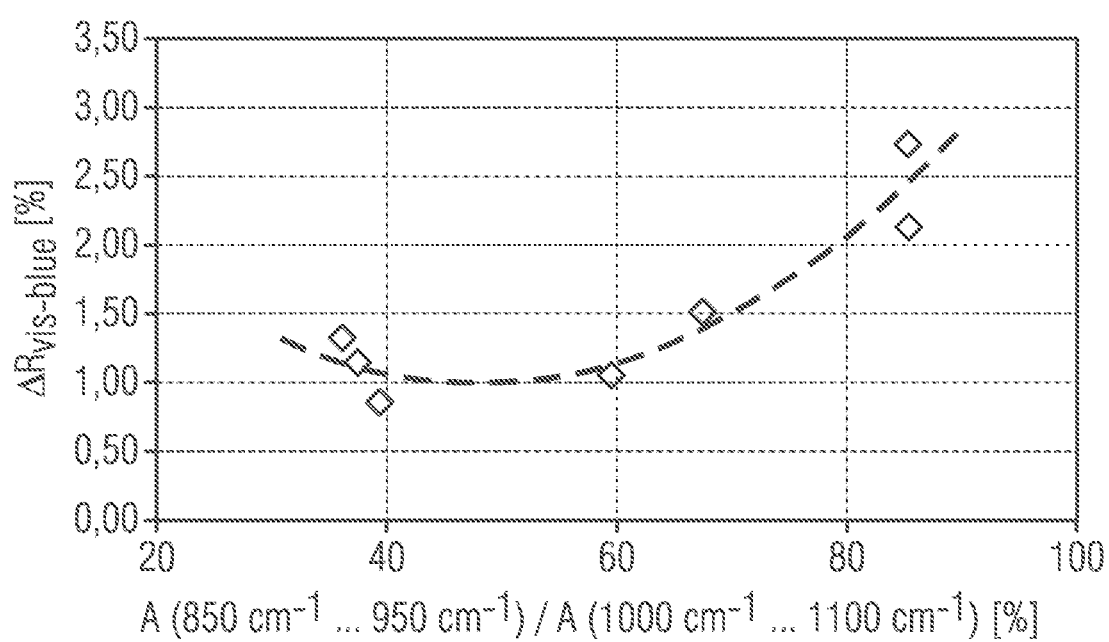
FIG. 5 shows a graphic illustration of the difference between the medium reflectivity in the entire visual spectral range and the reflectivity in the blue spectral range as a function of the quotient of the FTIR absorption in the wave number range 850 cm$^{-1}$ . . . 950 cm$^{-1}$ and the FTIR absorption in the wave number range 1000 cm$^{-1}$ . . . 1100 cm$^{-1}$.

This correlation is illustrated in FIG. 5. If the FTIR absorption ratio is below 65%, the reduction of the blue reflectivity with respect to the average visual reflectivity is less than 1.5%. If the FTIR absorption ratio is greater than 75%, the reduction of the blue reflectivity with respect to the visual reflectivity is above 2%. In this case, the reflected light exhibits increased yellow coloring. In order to avoid such yellow coloring, the layer thicknesses, materials and growth conditions are therefore adjusted in such a way that the FTIR absorption ratio is less than 65%.

The invention is not limited by the description on the basis of the exemplary embodiments. Instead, the invention comprises any new feature as well as any combination of features, which includes, in particular, any combination of features in the patent claims even if this feature or this combination itself is not explicitly specified in the patent claims or exemplary embodiments.

The invention claimed is:

1. A reflector element comprising:
    a plastic substrate;
    a silver layer arranged on the plastic substrate;
    a first barrier layer arranged on the silver layer, wherein the first barrier layer comprises an at least 15 nm-thick oxide layer; and
    a second barrier layer arranged on the first barrier layer, wherein the second barrier layer comprises siloxane, and wherein a thickness of the second barrier layer is at least 250 nm and at most 450 nm,
    wherein an integral IR absorption of the second barrier layer in a wave number range from 850 cm$^{-1}$ to 950 cm$^{-1}$ is less than 65% of the integral IR absorption in the wave number range from 1000 cm$^{-1}$ to 1100 cm$^{-1}$.

2. The reflector element according to claim 1, wherein the second barrier layer is a top layer of the reflector element.

3. The reflector element according to claim 1, wherein the first barrier layer comprises aluminum oxide, silicon oxide, titanium oxide or yttrium oxide.

4. The reflector element according to claim 1, wherein the first barrier layer has a thickness between 15 nm and 150 nm.

5. The reflector element according to claim 1, further comprising a metallic intermediate layer arranged between the plastic substrate and the silver layer.

6. The reflector element according to claim 5, wherein the metallic intermediate layer comprises Cr, Cu, Ni or Ti.

7. The reflector element according to claim 1, wherein the reflector element has an average reflectivity R$_{blue}$ in a wavelength range from 420 nm to 480 nm, and an average reflectivity R$_{vis}$ in an wavelength range from 420 nm to 760 nm, wherein $\Delta R_{vis-blue}=R_{vis}-R_{blue} \leq 1.5\%$.

8. A method for manufacturing a reflector element, the method comprising:
    applying a silver layer on a plastic substrate;
    applying a first barrier layer on the silver layer, wherein the first barrier layer is applied by a PVD method, wherein the first barrier layer comprises an at least 15 nm-thick oxide layer; and
    applying a second barrier layer on the first barrier layer, wherein the second barrier layer is applied by a CVD method, wherein the second barrier layer comprises siloxane, and wherein the second barrier layer has a thickness of at least 250 nm and of at most 450 nm, wherein an integral IR absorption of the second barrier layer in a wave number range from 850 cm$^{-1}$ to 950 cm$^{-1}$ is less than 65% of the integral IR absorption in the wave number range from 1000 cm$^{-1}$ to 1100 cm$^{-1}$.

9. The method according to claim 8, wherein the second barrier layer is an outermost layer of the reflector element.

10. The method according to claim 8, wherein the first barrier layer is applied by a sputtering method.

11. The method according to claim 8, wherein the first barrier layer comprises an oxide of at least one of Al, Si, Ti or Y.

12. The method according to claim 8, wherein the second barrier layer is formed by plasma polymerization of a silicon organic compound.

13. The method according to claim 12, wherein the silicon organic compound is hexamethyldisiloxane (HMDSO) or tetramethyldisiloxane (TMDSO).

14. A reflector element comprising:
a plastic substrate;
a silver layer arranged on the plastic substrate;
a first barrier layer arranged on the silver layer, wherein the first barrier layer comprises an at least 15 nm-thick oxide layer; and
a second barrier layer arranged on the first barrier layer, wherein the second barrier layer comprises siloxane, and wherein a thickness of the second barrier layer is at least 250 nm and at most 450 nm,
wherein the reflector element has an average reflectivity $R_{blue}$ in a wavelength range from 420 nm to 480 nm, and an average reflectivity $R_{vis}$ in an wavelength range from 420 nm to 760 nm, wherein $\Delta R_{vis\text{-}blue} = R_{blue} \leq 1.5\%$.

15. The reflector element according to claim 14, wherein the second barrier layer is a top layer of the reflector element.

16. The reflector element according to claim 14, wherein the first barrier layer comprises aluminum oxide.

17. The reflector element according to claim 14, wherein the first barrier layer comprises silicon oxide, titanium oxide or yttrium oxide.

18. The reflector element according to claim 14, wherein the first barrier layer has a thickness between 15 nm and 150 nm.

19. The reflector element according to claim 14, further comprising a metallic intermediate layer arranged between the plastic substrate and the silver layer.

20. The reflector element according to claim 19, wherein the metallic intermediate layer comprises Cr, Cu, Ni or Ti.

* * * * *